Sept. 18, 1956            L. F. SAMLER            2,763,308
SCREEN MOUNTING FOR CONDUITS AND TUBES FOR CONVEYING
FLUIDS AND FOR EXTRUSION MACHINES
Filed June 11, 1952            3 Sheets-Sheet 3

INVENTOR
Lee F. Samler,

BY Karl W. Flocks
ATTORNEY

United States Patent Office 2,763,308
Patented Sept. 18, 1956

2,763,308

SCREEN MOUNTING FOR CONDUITS AND TUBES FOR CONVEYING FLUIDS AND FOR EXTRUSION MACHINES

Lee F. Samler, Baltimore, Md., assignor to The National Plastic Products Company, Odenton, Md., a corporation of Maryland Application June 11, 1952, Serial No. 293,024

23 Claims. (Cl. 146—174)

The present invention relates to a screen structure. More particularly, the present invention relates to a screen for use in an extrusion machine or in a tube, such as a conduit.

The construction of an extrusion machine generally includes a strainer or screen which is positioned between the extruder die and screw. One of the purposes of the screen is to remove foreign particles from the extrudable materials before the die is reached, thereby eliminating possible defects in the finished extruded product. Another purpose of the screen is to create additional back pressure in the extruder, thereby minimizing the normal pulsing of the screw. It has furthermore been found advantageous to employ a screen in the extruding device to break up the agglomerates of resin or filler in the material passing through the extruder, thereby producing a more completely homogeneous mass for introduction into the die.

Since the extruder screen has a tendency to collect foreign matter rapidly, it is apparent that, unless the screen is cleaned or replaced at intervals, the continued use thereof will result in clogging and thereby cause the eventual shut-down of the extruding device. Prior to the instant invention, it has been the general practice to remove the screen periodically for replacement or cleaning depending upon the prevailing conditions. In any case, the cleaning or replacing procedure required that the machine be shut down, the die removed and the extrusion cylinder opened. In some instances, this procedure was relatively simple since it was only necessary to remove a few bolts, remove the die, and then replace or clean the screen. However, in most instances, where more complicated equipment was employed, a very involved procedure requiring great care and expenditure of time was necessary, particularly when large and heavy dies and auxiliary die equipment were associated with the extrusion cylinder and screen. In this latter procedure, precise adjustment and replacement were required to very fine tolerances in order to prevent leakage and assure alignment of flow. In carrying out the screen replacement in these latter machines, the loss of skilled labor was not only involved, but moreover, the loss of the machine time resulted when the machine was shut down. Moreover, there was a considerable amount of material lost in both shutting down and starting the machine. It is apparent that continuous shut-downs soon resulted in a prohibitive waste of valuable materials. Since screen replacement is necessary at least once a day or more, it is apparent that by employing the heretofore known screen replacement systems, more machines are necessary to keep production up to level, particularly in those instances where large production figures are required.

It is an object of the present invention to provide a screen for use in an extruder that may be replaced without discontinuing the operation of the extruder.

Another object of the present invention is to provide apparatus for simply and quickly removing a contaminated screen and inserting a new screen in an extrusion machine.

Other objects and the nature and advantages of the instant invention will be apparent from the following description taken in conjunction with the accompanying drawings, wherein.

Figure 1:
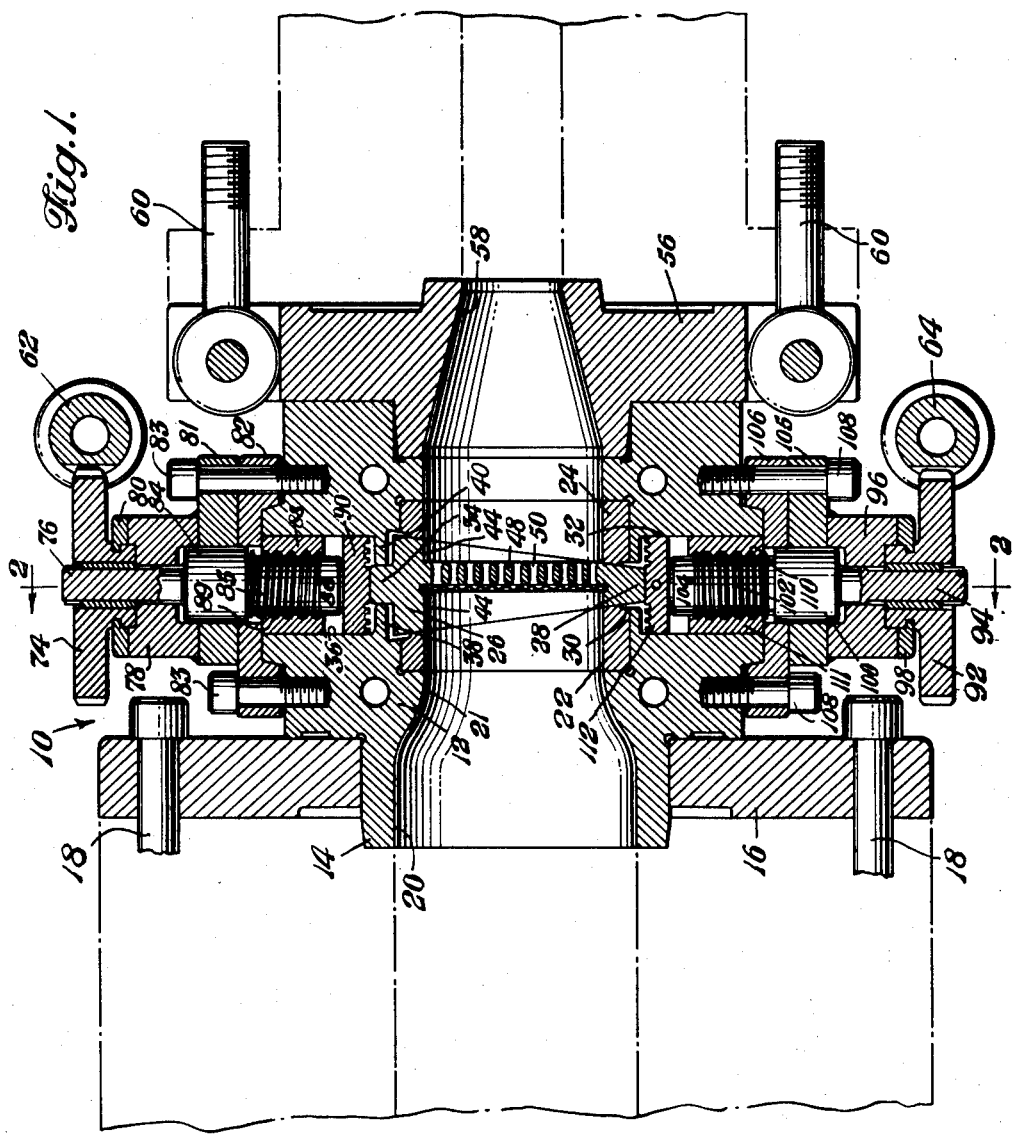
Fig. 1 is a vertical sectional view illustrating the present invention.
Figure 3:
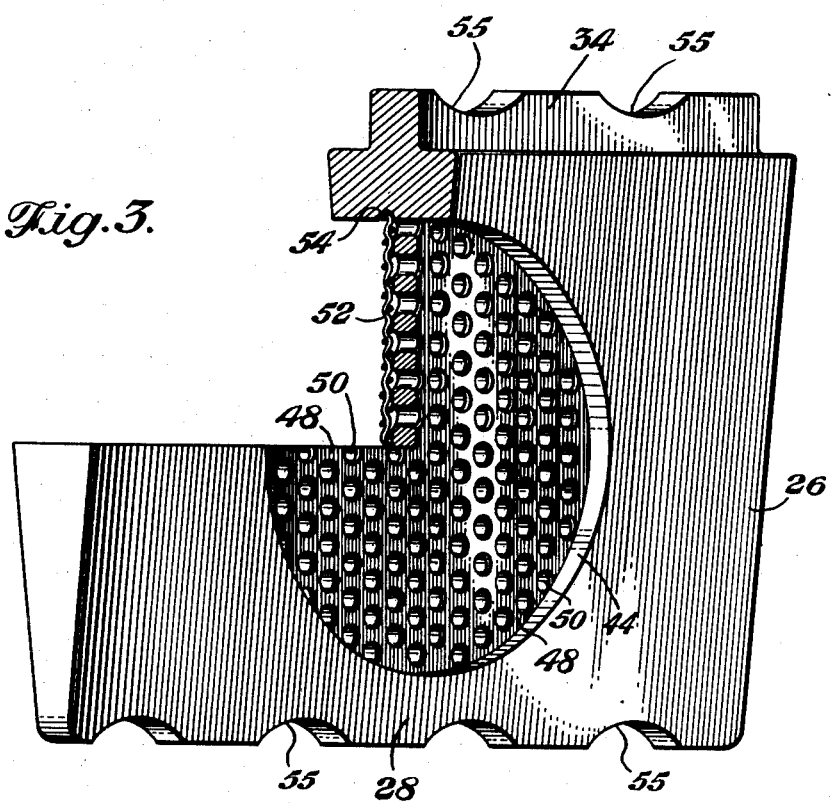
Fig. 3 is a perspective view of the screen frame shown in Figs. 1 and 2 with a portion thereof in section.

Referring to the drawings, and particularly to Fig. 1, a screen housing assembly is indicated generally at 10 and includes a body portion 12, which is formed integral with a tubular neck section 14. The neck section 14 has suitably secured thereto a head member 16 which is mounted on an extruder cylinder (not shown) by a series of stud bolts 18. The extruder cylinder, which houses the usual extruder screw member, registers with the neck section 14 and the cylinder bore is thereby adapted to communicate with a bore 20 formed in the neck section 14. The bore 20 extends inwardly from the neck section 14 into the reduced bore 21 formed in the body portion 12. Suitably secured in the body portion 12 and extending across the reduced bore 21 is a pair of ring members 22, 24 having tapered inner faces. The ring members 22, 24 are formed with their inner diameters equal to the diameter of the reduced bore 21 and are adapted to have seated between the tapered inner faces thereof a tapered screen frame 26 which, as shown in Fig. 3, comprises a plate-like cast member tapering into a relatively narrow bottom portion 28. The bottom portion 28 slidably fits between the ring members 22, 24 and projects into an opening 30 formed as an extension of a recess 32 located in the body portion 12. Formed on the upper end of the screen frame 26 is a reduced portion 34 which is guided into a recess 36 formed in the body portion 12 by a pair of oppositely disposed projections 38, 40 formed as part of the body portion 12.

As shown in Fig. 3, the tapered screen frame 26 has formed therein a cut-out section 44 which is circular in configuration and which has a diameter equal to the bore 21. Formed integral with the body of the screen frame 26 and disposed in the cut-out section 44 is a plate 48 having openings 50 formed therein. Also disposed in the circular cut-out section 44 and positioned adjacent the plate 48 is a screen 52 which is adapted to filter out foreign matter from the extrudable material as it is advanced through the bore 21. The screen 52 is locked in position in suitable grooves 54, which are formed in the screen frame 26. Cut out from the bottom portion 28 and upper reduced portion 34 of the screen frame 24 is a series of grooves 55 adapted to reduce the sliding area of the screen frame 24, thereby enabling the screen frame to be easily and slidably moved into position between the rings 22, 24.

Suitably secured to the body portion 12 is a die attaching head 56 which has formed therein a diverging bore 58. The bore 58 registers with the bore 21 in the body portion 12 and communicates with a suitable die (not shown) which is adapted to be secured to the die attaching head 56 by hinged bolts 60.

When the extruding machine has been in operation a sufficient length of time to collect a prohibitive amount of foreign matter in the screen 52, it is necessary to replace the screen. It is apparent that if the screen is not replaced at this time, it will become clogged which will cause the flow of material therethrough to lessen and will eventually result in the shut-down of the machine.

Figure 2:
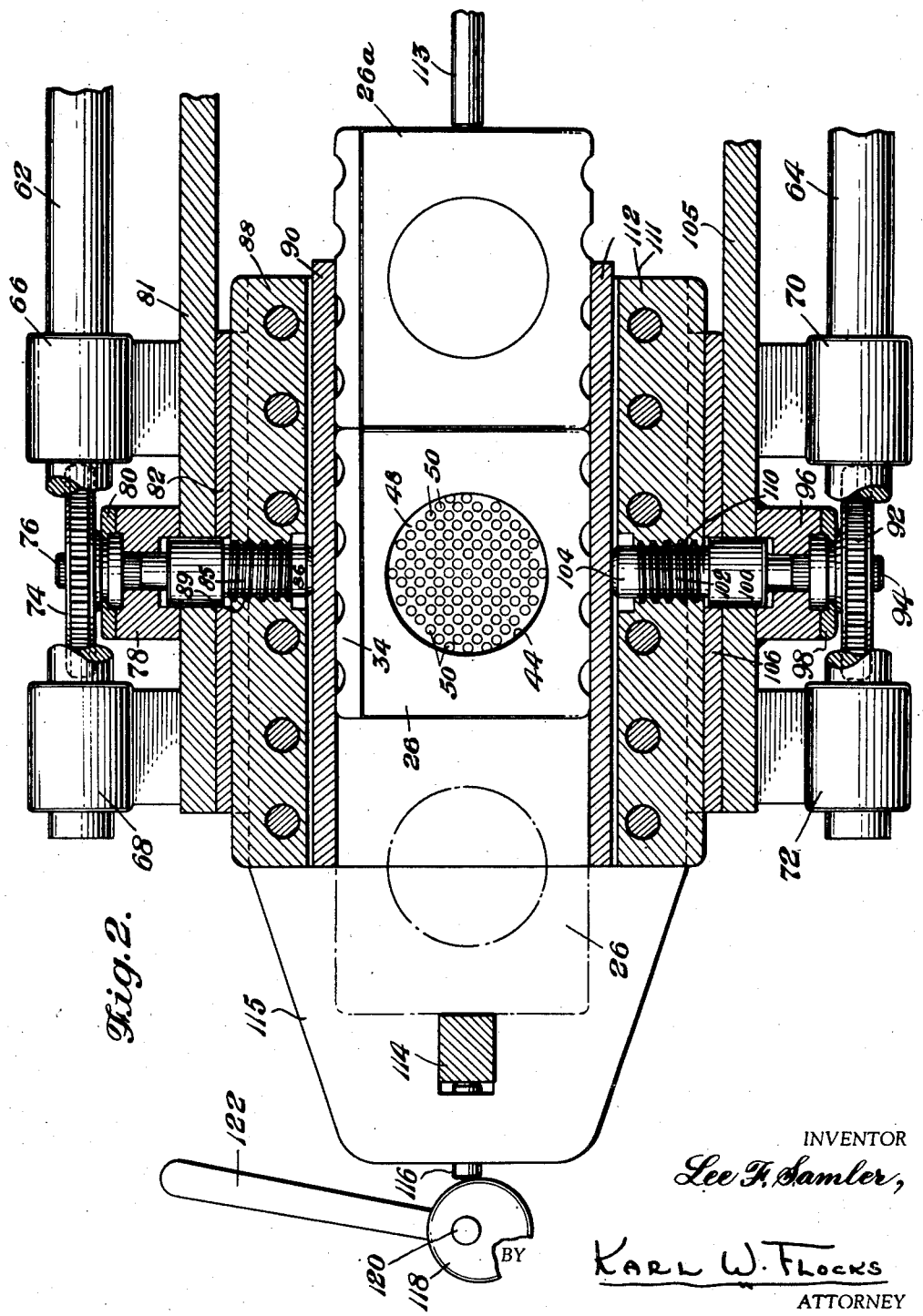
Fig. 2 is a view taken along the line 2—2 of Fig. 1.

In order to avoid shutting down the machine during the screen replacing operation, thereby resulting in considerable loss of time and labor, the present invention incorporates a screen replacing mechanism that efficiently and quickly accomplishes the change of screens in a matter of seconds and during the normal operation of the machine. Since screen 52 is securely locked in the tapered screen frame 26, it is necessary to replace the entire screen frame 26, which will, in effect, change the screen. As shown in Fig. 1, the tapered screen frame 26 is firmly positioned between the ring members 22, 24 in the body portion 12. It is apparent that by moving the tapered screen frame 26 upwardly, it will become loosened and can then be slidably removed from the body portion 12. Referring now to Figs. 1 and 2, the mechanism for replacing the screen is illustrated and includes oppositely disposed racks 62, 64. The rack 62 is reciprocated by suitable power means (not shown) and is supported by spaced bearing posts 66, 68. Similarly, rack 64 is reciprocated by suitable power means (not shown) and is supported by spaced bearing posts 70, 72. The rack 62 engages a gear 74 which is splined to a reciprocable shaft 76 rotating in a bearing 78. The gear 74 is prevented from endwise movement by a ring 80 located adjacent the bearing 78. A frame member 81 supports the bearing 78 and has disposed thereunder in abutting relation thereto a spacer 82. The spacer 82 snugly fits on the body portion 12 and is secured thereto along with the frame member 81 by stud bolts 83. The shaft 76 has integrally connected thereto an enlarged portion 84 which extends through the frame member 81 and spacer 82 and includes a threaded portion 85 and an end portion 86. Secured in the recess 36 is a stationary elongated bar 88 which has a threaded opening 89 formed therein. The threaded portion 85 of the shaft 76 is threadedly engaged in the opening 89 while the end portion 86 of the shaft 76 abuts against an upper pressure bar 90. The upper pressure bar 90 is also disposed in the recess 36 and contacts therein the reduced portion 34 of the screen frame 26. It is apparent that end portion 86 is raised from or lowered against the upper pressure bar 90 by actuating the suitable power means which moves the rack 62. Upon movement of the rack 62, the gear 74 rotates which causes the shaft 76 to rotate. The threaded portion 85 of the shaft 76 then rotates in the stationary elongated bar 88. The effect of this movement is to cause the shaft 76 to move vertically with respect to the bar 88, thereby varying the vertical position of the end portion 86.

The operating mechanism associated with the rack 64 is similar to that described hereinabove and includes a gear 92 engaging the rack 64. A reciprocable shaft 94 is splined to the gear 92 and rotates in a bearing 96. A retaining ring 98 secured to the gear 92 prevents endwise movement thereof. The shaft 94 includes an enlarged portion 100 which has a threaded portion 102 and an end portion 104 formed thereon. The enlarged portion 100 extends through a frame member 105 and a spacer 106, both of which are secured to the body portion 12 by stud bolts 108. The threaded portion 102 engages a threaded opening 110 formed in a stationary elongated bar 111 located in recess 32 and the end portion 104 contacts a lower pressure bar 112 also disposed in the recess 32. The pressure bar 112, in turn, abuts against the bottom portion 28 of the tapered screen frame 26 and is adapted to cause vertical movement thereof when it is desired to replace the screen frame.

The operation of the above-described device is as follows:

The material to be extruded is forced into the bore 20 from the extruder cylinder by the extruder screw. The material passes into reduced bore 21 and then through the screen frame 26 at which point any foreign matter present in the extrudable material is strained by the screen 52 and plate 48. The plate 48 supports the screen 52 during the straining operation, thereby preventing the tearing thereof due to the pressure exerted by the cylinder screw. The strained material passes into bore 58 and then into the die, which is secured adjacent thereto. After the extrusion has been in operation for a certain period of time, the screen 52 and plate 48 will begin to become clogged. It is then necessary to replace the screen frame 26 with a clean screen frame. Without shutting down the machine, the racks 62 and 64 are moved simultaneously by power means (not shown). However, it is apparent that the power means for the racks 62, 64 may be individually controlled or operated by a single control. When the racks 62, 64 are moved, the gears 74 and 92 are rotated, which causes the shafts 76 and 94 to be moved in a vertical direction a slight amount. If the screen frame 26 is to be replaced, the rack 64 moves in a direction to cause the gear 92 to force the shaft 94 upwardly. Similarly, the rack 62 is moved in a direction to cause gear 74 to move the shaft 76 upwardly, the distance of the upward movement of shaft 76 corresponding to the distance of the upward movement of the shaft 94. It is understood that the shafts 76, 94 are only moved that amount that will cause the tapered screen frame 26 to become loosened from between the ring members 22, 24. As the shaft 94 moves upwardly, the end portion 102 forces the lower pressure bar 112 firmly against the bottom portion 28 of the screen frame 26. Further upward movement of the shafts 76 and 94 causes the lower pressure bar 112 to lift the screen frame 26 from its wedged position between the ring members 22, 24. When the screen frame 26 is moved upwardly enough to cause it to slide freely, a new screen frame is slidably moved by a bar 113 (Fig. 2) which is actuated by suitable power means (not shown). The bar 113 forces the new screen frame into position in the body portion 12 between ring members 22, 24 and in so doing moves the used screen frame out of the body portion for disposal thereof. The correct aligned position of the new screen frame is assured by mounting a stop bar 114 in a housing 115, which is secured to the screen housing assembly 10. The stop bar 114 is controlled by a plunger 116 which is actuated by a cam 118 mounted on a shaft 120. A handle 122 is provided for manually adjusting the cam 118, which actuates the plunger 116, thereby controlling the position of the stop bar 114. It is apparent that the stop bar 114 will limit the movement of the ejected screen frame which is forced from the position between the ring members 22, 24 by the new screen. Referring to Fig. 2, the positions of the screen frame are illustrated before and after the screen frame replacing operation. A new screen frame 26a is positioned adjacent the old screen frame 26 and is adapted to be moved transversely by the bar 113. When the screen frame 26 is loosened from its wedged position, the bar 113 is actuated to quickly move the screen frame 26a between the ring members 22, 24 and, in so doing, move the screen frame 26 to the position abutting the stop bar 114 shown in dotted lines in Fig. 2. When the screen frame 26 reaches the stop bar 114, the new screen frame 26a is in the correct aligned position. The screen changing operation is completed by removing the screen frame 26 from the screen housing assembly 10 and actuating the racks 62, 64 to move the shafts 76 and 94 downwardly. Downward movement of the shaft 76 forces the upper pressure bar 90 downwardly against the reduced portion 34 of the new screen frame 26a, thereby wedging the tapered screen frame 26a firmly between the ring members 22, 24. It will be apparent from Fig. 2 that as the screen frames are interchanged, a portion of one of the screens locked in the screen frames 26, 26a will register with the bore 21 at all times, thus assuring a continuous flow of material through the bore 21. As the screen frame shifting and replacing operation described hereinabove is accomplished it is essential that a minimum leakage of material be allowed. Moreover, it is important to seat the new screen frame 26a between the tapered rings 22, 24 so that there is no possible point of leakage. Thus, even though the screen changing operation is performed under high pressures, a leakproof seal is accomplished. It is apparent that unless the new screen be seated properly, leakage of the material would result which would also cause local points of material stagnation. This condition on continued operation would cause material descomposition which would, in many cases, have a deleterious effect on the extruded product.

From the above description, it is apparent that a new screen frame may be put into operation quickly, efficiently and with a minimum of effort. The actual screen frame replacing operation is performed in a matter of seconds, obviating the necessity of shutting down the extrusion machine and thereby materially conserving valuable time and labor so vital in large production plants.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In apparatus for use in an extrusion machine or the like, a tubular body portion, said tubular body portion having a wedge-shaped opening extending therethrough, a wedge-shaped frame positioned in said opening in sealed relation and having a screened opening formed therein in registry with the bore of said tubular body portion, and means engaging said wedge-shaped frame for unsealing said frame from said wedge-shaped opening.

2. In apparatus for use in an extrusion machine or the like, a tubular body portion, a tapered frame engaging said body portion and having a screened opening formed therein in registry with the bore of said tubular body portion, said screened opening screening impurities from material passing through said bore, and means operatively engaging said frame for moving said tapered frame out of engagement with said tubular body, said tapered frame being moved in a direction transverse to the axis of said bore.

3. In apparatus for use in an extrusion machine or the like, a body portion having a bore formed therein, a frame seated in said body portion, said frame having an opening formed therein, receiving a screen therein, said screen being positioned in communication with said bore for screening impurities from material passing therethrough, means engaging said frame for moving said frame in a first direction transverse to the axis of said bore for unseating said frame therein, and means associated with said frame for moving said frame in a second direction transverse to the axis of the bore and transverse to said first movement for removing said screen frame from said body portion.

4. In apparatus for changing screens, a body portion having a bore formed therein, a first screening means seated in said body portion in communication with said bore, a second screening means located adjacent said first screening means and adapted to replace said first screening means, means associated with said first screening means for moving said first screening means in a direction transverse to the axis of said bore to unseat said first screening means from said body portion, and means associated with said first and second screening means for ejecting the unseated first screening means from said body portion and simultaneously inserting said second screening means therein.

5. In apparatus for changing screens as set forth in claim 4, wherein said moving means is actuated to move said second screening means in a direction transverse to the axis of said bore to seat said second screening means in said body portion.

6. In apparatus for changing screens, a body portion having a bore formed therein, a first screening means seated in said body portion in communication with said bore and located in a plane transverse to the axis of said bore, a second screening means located adjacent said first screening means, and adapted to replace said first screening means, means associated with said first screening means for moving said first screening means in the same plane in which it is disposed to unseat said first screening means from said body portion, and means associated with said first and second screening means for ejecting the unseated first screening means from said body portion and simultaneously inserting said second screening means therein.

7. In apparatus for changing screens, a body portion having a bore formed therein, screening means seated in said body portion in communication with said bore, means for unseating said screening means from said body portion including means operatively positioned in said apparatus for moving said screening means in a direction transverse to the axis of said bore, and means for ejecting said screening means from said body portion and simultaneously inserting a replacement screening means therein, said ejecting means operatively engaging said replacement screening means.

8. In apparatus for changing screens as set forth in claim 7, which includes means operatively associated with said ejected screening means for limiting the movement of the ejected screening means and correctly positioning said replacement screening means in said body portion.

9. In an apparatus, means for moving fluid medium through said apparatus, a first means for screening said medium, a second means for screening said medium, said first and second screening means being adapted to be associated with said apparatus in a sealed position, in an unsealed position, in an advance position, and in a post position, means positioned in said apparatus for locking and unlocking said screening means therein, means positioned in said apparatus for moving said second screening means from said advance position to said unsealed position and simultaneously therewith moving said first screening means from said unsealed position to said post position; said first screening means being unsealed by movement in a direction transverse to the direction of flow of fluid and moved to said post position simultaneously with the movement of said second screening means from said advance position to said unsealed position, and thereafter said locking and unlocking means locking said second screening means in the sealed position by causing movement thereof in a direction transverse to the direction of flow of fluid in a manner such that said apparatus may be operated substantially continuously to effectively and in a substantially continuous manner screen fluid medium passing therethrough with substantially no leakage.

10. In an apparatus, means for moving fluid medium through said apparatus, a first means for screening said medium, said first screening means being disposed in an operatively sealed position in said apparatus, a second screening means for screening said medium, said second screening means being disposed in an inoperative position in said apparatus, means operatively associated with said first screening means for moving said first screening means in a direction transverse to the direction of flow of fluid to an unsealed position, means associated with said first and second screening means for moving said unsealed first screening means to an inoperative position and simultaneously moving said second screening means to the operative position, said second screening means being moved in a direction transverse to the direction of flow of fluid and being sealed in said operative position by said operating means such that said apparatus is operated substantially continuously to effectively and in a substantially continuous manner screen fluid medium passing therethrough with substantially no leakage.

11. In an apparatus, means for moving fluid medium through said apparatus, a first means for screening said medium, a second means for screening said medium, said screening means being adapted to be associated with said apparatus in a sealed position, in an unsealed position, in an advance position, and in a post position, means associated with said first screening means for moving said first screening means in a direction transverse to the flow of fluid to the sealed position, means positioned in said apparatus for positively receiving said first screening means in said sealed position, said moving means being adapted to move said first screening means to the unsealed position when said first screening means is to be moved to the post position, means operatively associated with said first and second screening means for moving said first screening means from the unsealed position to the post position and simultaneously moving said second screening means from the advance position to the unsealed position, said first named moving means thereafter moving said second screening means in a direction transverse to the flow of fluid to the sealed position in a manner such that said apparatus may be operated substantially continuously to effectively and in a substantially continuous manner screen fluid medium passing therethrough with substantially no leakage.

12. In an apparatus, means for moving fluid medium through said apparatus, a first means for screening said medium and located in an operative position in said apparatus, a second means for screening said medium and located in an inoperative position in said apparatus, said first and second screening means comprising frame-like elements which are adapted to be associated with said apparatus in a sealed position, in an unsealed position, in an advance position, and in a post position, operating means associated with said first screening means for moving said first frame-like screening means in a direction transverse to the flow of fluid to the sealed position, means associated with said apparatus for positively receiving said first frame-like screening means in said sealed position, said operating means being adapted to move said first frame-like screening means in a direction transverse to the flow of fluid out of engagement with said receiving means to the unsealed position when said first frame-like screening means is to be moved to the post position, means associated with said first and second screening means for moving said frame-like screening means from the unsealed position to the post position and simultaneously moving said second frame-like screening means from the advance position to the unsealed position, said operating means thereafter moving said second frame-like screening means in a direction transverse to the flow of fluid medium to the sealed position in engagement with said receiving means in a manner such that said apparatus may be operated substantially continuously to effectively and in a substantially continuous manner screen fluid medium passing therethrough with substantially no leakage.

13. In an apparatus as set forth in claim 12, wherein said frame-like elements comprising the screening means for said fluid medium are formed in a wedge-like configuration.

14. In apparatus for use in an extrusion machine or the like, a screen frame comprising a body tapering upwardly from a narrow bottom portion to an enlarged upper portion, a reduced portion formed integral with said upper portion, a cut-out section formed in said body, a perforated plate integral with said body and disposed in said cut-out section, and a screen disposed in said cut-out section adjacent said plate and secured in said body, said tapered body being adapted to be fitted in said apparatus in sealing relation therewith.

15. In apparatus for use in an extrusion machine or the like, a screen frame comprising a tapered body having a narrow bottom portion and a widened upper portion, a reduced portion formed integral with said upper portion, a perforated plate disposed in said body and integral therewith, and a screen secured in said body adjacent said plate, said tapered body being adapted to be fitted in said apparatus in sealing relation therewith.

16. In apparatus for use in an extrusion machine or the like, a screen frame comprising a body having a wedge-shaped configuration, a perforated plate disposed in said body, and a screen secured in said body adjacent said plate, said wedge-shaped body being adapted to be fitted in said apparatus in sealing relation therewith.

17. In apparatus for use in an extrusion machine or the like, a tubular body portion, said tubular body portion having a wedge-shaped opening extending therethrough, a wedge-shaped frame positioned in said opening in sealed relation and having a screened opening formed therein in registry with the bore of said tubular body portion, and means operatively engaging the narrow end portion of said wedge-shaped frame for unsealing said frame from said wedge-shaped opening.

18. In apparatus as set forth in claim 17, which further includes means operatively associated with said frame for removing said frame from said wedge-shaped opening.

19. In apparatus as set forth in claim 17, which further includes a second wedge-shaped frame positioned adjacent said first-named frame and adapted to replace said first-named frame.

20. In apparatus as set forth in claim 17, which further includes ring means having tapered faces positioned in said bore and receiving said wedge-shaped frame therebetween.

21. In apparatus as set forth in claim 17 wherein said engaging means includes bar means engaging said narrow end portion of said wedge-shaped frame and shaft means engaging said bar means and adapted to be rotated to urge said bar means into contact with said frame for causing movement thereof.

22. In apparatus as set forth in claim 18, wherein the movement unsealing said frame is in a direction transverse to the axis of said bore, and said movement removing said frame from said wedge-shaped opening is in a direction transverse to the axis of said bore and transverse to the unsealing movement.

23. In apparatus as set forth in claim 19, which further includes means engaging said second-named frame for moving said first-named frame out of said wedge-shaped opening in said tubular body portion and simultaneously moving said second-named frame into said wedge-shaped opening.

References Cited in the file of this patent

UNITED STATES PATENTS

| | | |
|---|---|---|
| 642,813 | Cowen | Feb. 6, 1900 |
| 642,814 | Cowen | Feb. 6, 1900 |
| 1,195,576 | Garrahan | Aug. 22, 1916 |
| 2,184,177 | Burrell | Dec. 19, 1939 |
| 2,507,311 | Lodge | May 9, 1950 |
| 2,661,497 | Birmingham | Dec. 8, 1953 |

FOREIGN PATENTS

| | | |
|---|---|---|
| 637,137 | Great Britain | May 10, 1950 |